US011064855B2

(12) United States Patent
Hwang et al.

(10) Patent No.: US 11,064,855 B2
(45) Date of Patent: Jul. 20, 2021

(54) CLEANER

(71) Applicant: LG ELECTRONICS INC., Seoul (KR)

(72) Inventors: Philjae Hwang, Seoul (KR); Mantae Hwang, Seoul (KR); Jungbae Hwang, Seoul (KR); Eunji Sung, Seoul (KR); Taekgi Lee, Seoul (KR)

(73) Assignee: LG Electronics Inc., Seoul (KR)

(*) Notice: Subject to any disclaimer, the term of this patent is extended or adjusted under 35 U.S.C. 154(b) by 174 days.

(21) Appl. No.: 16/328,108

(22) PCT Filed: Aug. 18, 2017

(86) PCT No.: PCT/KR2017/009059
§ 371 (c)(1),
(2) Date: Feb. 25, 2019

(87) PCT Pub. No.: WO2018/038473
PCT Pub. Date: Mar. 1, 2018

(65) Prior Publication Data
US 2019/0183301 A1    Jun. 20, 2019

(30) Foreign Application Priority Data

Aug. 25, 2016   (KR) .......................... 10-2016-0108314
Apr. 11, 2017   (KR) .......................... 10-2017-0046657

(51) Int. Cl.
*B01D 50/00*   (2006.01)
*A47L 9/10*    (2006.01)
(Continued)

(52) U.S. Cl.
CPC ................. *A47L 9/106* (2013.01); *A47L 5/24* (2013.01); *A47L 9/127* (2013.01); *A47L 9/165* (2013.01);
(Continued)

(58) Field of Classification Search
CPC ... A47L 9/106; A47L 5/24; A47L 9/28; A47L 9/2857; A47L 9/2884; A47L 9/1625;
(Continued)

(56) References Cited

U.S. PATENT DOCUMENTS 6,782,585 B1 *  8/2004  Conrad .................... A47L 5/225
                                            15/351
7,867,307 B2 *  1/2011  Bates ..................... A47L 9/1633
                                            55/343
(Continued)

FOREIGN PATENT DOCUMENTS

CN       101489461        7/2009
CN       101584566       11/2009
(Continued)

OTHER PUBLICATIONS

Japanese Notice of Allowance in Japanese Appln. No. 2019-527112, dated May 26, 2020, 5 pages (with English translation).
(Continued)

*Primary Examiner* — Dung H Bui
(74) *Attorney, Agent, or Firm* — Fish & Richardson P.C.

(57) ABSTRACT

A cleaner includes a suction unit guiding air and dust, a main body including a first cyclone unit separating the air and the dust, which are suctioned through the suction unit, from each other and a second cyclone unit separating the dust from the air discharged from the first cyclone unit, and a guide unit disposed in the main body to partition a first dust storage part, in which the dust separated in the first cyclone unit is stored, and a second dust storage part, in which the dust separated in the second cyclone unit is stored, from each other. The guide unit is separably coupled to the main body, and when the guide unit is separated from the main body, a dust discharge part of the second cyclone unit is exposed to the outside.

18 Claims, 16 Drawing Sheets

(51) Int. Cl.
| | |
|---|---|
| *A47L 5/24* | (2006.01) |
| *A47L 9/28* | (2006.01) |
| *A47L 9/16* | (2006.01) |
| *A47L 9/12* | (2006.01) |
| *A47L 9/32* | (2006.01) |
| *B01D 46/24* | (2006.01) |
| *B04C 5/185* | (2006.01) |
| *B04C 5/26* | (2006.01) |
| *B04C 9/00* | (2006.01) |
| *B01D 45/16* | (2006.01) |

(52) U.S. Cl.
CPC ........... *A47L 9/1608* (2013.01); *A47L 9/1616* (2013.01); *A47L 9/1625* (2013.01); *A47L 9/1641* (2013.01); *A47L 9/1658* (2013.01); *A47L 9/1683* (2013.01); *A47L 9/28* (2013.01); *A47L 9/2857* (2013.01); *A47L 9/2884* (2013.01); *A47L 9/322* (2013.01); *B01D 46/24* (2013.01); *B04C 5/185* (2013.01); *B04C 5/26* (2013.01); *B04C 9/00* (2013.01); *B01D 45/16* (2013.01); *B01D 46/2403* (2013.01); *B01D 50/002* (2013.01); *B01D 2279/55* (2013.01); *B04C 2009/004* (2013.01)

(58) Field of Classification Search
CPC ...... A47L 9/1641; A47L 9/127; A47L 9/1608; A47L 9/1616; A47L 9/165; A47L 9/1658; A47L 9/1683; A47L 9/322; A47L 9/00; A47L 9/22; A47L 9/12; A47L 9/2842; A47L 9/149; B01D 46/24; B01D 46/2403; B01D 45/16; B01D 50/002; B01D 2279/55; B04C 5/185; B04C 5/26; B04C 9/00; B04C 2009/004
See application file for complete search history.

(56) References Cited

U.S. PATENT DOCUMENTS

| | | | |
|---|---|---|---|
| 8,156,609 B2 | 4/2012 | Milne et al. | |
| 8,236,077 B2 | 8/2012 | Gomiciaga-Pereda et al. | |
| 8,444,731 B2 | 5/2013 | Gomiciaga-Pereda et al. | |
| 8,925,145 B2 | 1/2015 | Wilson | |
| 9,144,358 B2 | 9/2015 | Smith | |
| 2009/0307863 A1 | 12/2009 | Milne et al. | |
| 2009/0307864 A1* | 12/2009 | Dyson | A47L 9/22 15/344 |
| 2009/0313958 A1 | 12/2009 | Gomiciaga-Pereda et al. | |
| 2009/0313959 A1 | 12/2009 | Gomiciaga-Pereda et al. | |
| 2010/0132319 A1* | 6/2010 | Ashbee | A47L 9/1641 55/429 |
| 2010/0242221 A1* | 9/2010 | Horne | A47L 9/1641 15/347 |
| 2011/0016659 A1* | 1/2011 | Dyson | A47L 9/1666 15/347 |
| 2012/0000029 A1* | 1/2012 | Nicolaou | A47L 9/20 15/300.1 |
| 2012/0210537 A1* | 8/2012 | Makarov | A47L 9/1641 15/353 |
| 2012/0266576 A1 | 10/2012 | Gomiciaga-Pereda et al. | |
| 2012/0284960 A1* | 11/2012 | Sutton | A47L 9/1633 15/353 |
| 2013/0160233 A1* | 6/2013 | Peace | A47L 9/1641 15/353 |
| 2014/0013538 A1* | 1/2014 | Dyson | A47L 9/1625 15/353 |
| 2014/0137363 A1* | 5/2014 | Wilson | A47L 9/1683 15/347 |
| 2014/0223871 A1* | 8/2014 | Makarov | B04C 5/26 55/343 |
| 2014/0325789 A1* | 11/2014 | Hill | A47L 9/0081 15/344 |
| 2014/0366495 A1* | 12/2014 | Stickney | A47L 9/1683 55/343 |
| 2015/0143659 A1* | 5/2015 | Pilch | A47L 9/325 15/347 |
| 2015/0216384 A1* | 8/2015 | Bower | A47L 9/1608 55/320 |
| 2016/0088988 A1 | 3/2016 | Eo et al. | |
| 2017/0280950 A1* | 10/2017 | Nam | A47L 9/2884 |
| 2018/0125316 A1* | 5/2018 | Woo | A47L 9/108 |

FOREIGN PATENT DOCUMENTS

| | | | | |
|---|---|---|---|---|
| CN | 103040409 | | 4/2013 | |
| CN | 203736116 | | 7/2014 | |
| JP | 2009279284 | | 12/2009 | |
| JP | 2009543636 | | 12/2009 | |
| JP | 2014036683 | A | 2/2014 | |
| JP | 2014100572 | | 6/2014 | |
| JP | 2014-171669 | A | 9/2014 | |
| JP | 2015033647 | A * | 2/2015 | ........... A47L 9/1641 |
| JP | 2016013262 | | 1/2016 | |
| JP | 5912988 | | 4/2016 | |
| KR | 10-2009-0026208 | A | 3/2009 | |
| KR | 10-1622726 | B1 | 9/2014 | |
| KR | 10-2016-0094123 | A | 8/2016 | |
| KR | 10-2016-0099730 | A | 8/2016 | |
| TW | 201601670 | | 1/2016 | |

OTHER PUBLICATIONS

Chinese Office Action in Chinese Appln. No. 201780051597.4, dated Sep. 1, 2020, 15 pages (with English translation).

* cited by examiner

CLEANER

This application is a National Stage application under 35 U.S.C. § 371 of International Application No. PCT/KR2017/009059, filed on Aug. 18, 2017, which claims the benefit of Application No. 10-2017-0046657, filed on Apr. 11, 2017 and Application No. 10-2016-0108314, filed on Aug. 25, 2016. The disclosures of the prior applications are incorporated by reference in their entirety.

TECHNICAL FIELD

The present disclosure relates to a cleaner.

BACKGROUND ART

A cleaner is a device that performs cleaning by sucking and wiping dust or foreign substances on a surface to be cleaned.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

A cyclonic separating apparatus is disclosed in Korean Patent Publication No. 10-2009-0026209 (Publication Date: Mar. 11, 2009) that is a prior art document. The cyclonic separating apparatus constitutes a portion of a hand-held cleaner.

The cyclonic separating apparatus includes a cyclone having a wall and a base closing one end of the cyclone.

A cover is provided in the cyclone. The cover includes a cylindrical wall having a plurality of through-holes and an inner wall disposed inside the cylindrical wall.

The cyclonic separating apparatus further includes an additional cyclone assembly, and the additional cyclone assembly includes a cone-shaped opening. The cone-shaped opening is disposed to pass through the inner wall of the cover and communicate with a passage defined by the inner wall.

Also, a dust collector is disposed below the passage. The inside of the dust collector is surrounded by the base.

Dust is separated from air by the additional cyclone assembly. Here, the dust separated by the additional cyclone assembly may frequently block the cone-shaped opening. In this case, it is necessary to clean the cone-shaped opening.

However, according to the prior art, even though the base rotates to open the inside of the dust collector, since the cone-shaped opening is disposed inside the cover disposed on an upper portion of the dust collector, it is difficult to allow a user to access to the cone-shaped opening.

DISCLOSURE OF THE INVENTION

Technical Problem

Embodiments provide a cleaner in which a dust discharge part of a second cyclone unit is capable of being cleaned in a state in which the second cyclone unit is disposed in a main body.

Embodiments also provide a cleaner in which a dust discharge part of a second cyclone unit is exposed to the outside when a guide unit guiding air to the second cyclone unit is separated from a main body so that the dust discharge part is easily cleaned.

Embodiments also provide a cleaner in which a guide unit and a contact part of a second cyclone unit are maintained in a sealed state there between when a guide unit is mounted on a main body.

Embodiments also provides a cleaner in which foreign substances such as hairs, which are contained in a dust container, are capable of being discharged to the outside of the dust container while a guide unit guiding air to a second cyclone unit is separated from a main body.

Technical Solution

In one embodiment, a cleaner includes: a suction unit guiding air and dust; a main body including a first cyclone unit separating the air and the dust, which are suctioned through the suction unit, from each other and a second cyclone unit separating the dust from the air discharged from the first cyclone unit; and a guide unit disposed in the main body to partition a first dust storage part, in which the dust separated in the first cyclone unit is stored, and a second dust storage part, in which the dust separated in the second cyclone unit is stored, from each other.

The guide unit may be separably coupled to the main body. When the guide unit is separated from the main body, the guide unit may cover the second cyclone unit.

When the guide unit is separated from the main body, a dust discharge part of the second cyclone unit may be exposed to the outside.

The main body may further include a dust container including the first dust storage part.

The dust container may have a discharge opening, and the guide unit may be withdrawn to the outside of the dust container through the discharge opening.

The guide unit may include: a filter part by which the air separated from the dust in the first cyclone unit is filtered while flowing to the second cyclone unit and surrounding the second cyclone unit; and a storage unit connected to a lower portion of the filter part and defining the second dust storage part in the dust container.

In the state in which the filter part and the storage unit are coupled to each other, the filter part and the storage unit may be withdrawn together to the outside of the main body.

A sealing member may be disposed on the second cyclone unit

The storage unit may include a contact rib coming into contact with the sealing member. The contact rib may press the sealing member.

The second cyclone unit may include a sealing member coupling part to which the sealing member is coupled.

The sealing member coupling part may be disposed on the second cyclone unit to allow the dust discharge part of the second cyclone unit to pass there through. The sealing member coupling part may surround a circumference of the second cyclone unit.

A sealing member fitting groove into which the sealing member is fitted may be defined in a lower portion of the sealing member coupling part. The contact rib may come into contact with a bottom surface of the sealing member.

Each of the sealing member and the contact rib may have a ring shape.

The dust discharge part of the second cyclone unit may be disposed in a region defined by the contact rib in the state in which the contact rib comes into contact with the bottom surface of the sealing member.

A portion of a lower portion of the filter part may be coupled to the storage unit in a state in which the filter part is inserted into an upper portion of the storage unit.

The storage unit may include an inner body coupled to the filter part and an outer body surrounding the inner body.

The second dust storage part may be disposed inside the inner body, and the first dust storage pat may be disposed between an inner circumferential surface of the dust container and an outer surface of the outer body.

The dust discharge part of the second cyclone unit and the sealing member may be disposed inside the inner body The coupling rib may protrude from the inner body.

The inner body may include a first portion and a second portion extending upward from the first portion.

The first portion may have a cylindrical shape, and a lower portion of the filter part may be inserted into the first portion. The second portion may have a diameter that gradually decreases downward.

The coupling rib may protrude from the first portion, the second portion, or a boundary between the first portion and the second portion.

The cleaner may further include at least one sealer disposed between the inner body and the outer body.

The filter part may include: a filter body having a plurality of openings; and a mesh covering the plurality of openings. An air inlet of the second cyclone unit may be disposed inside the filter part.

The main body may further include a discharge guide guiding the air discharged from the second cyclone unit. The filter part may be separably coupled to the discharge guide.

The discharge guide may include a first coupling part to be coupled to the filter part, and the filter part may include a second coupling part to be coupled to the first coupling part.

The second coupling part may include a first groove into which the first coupling part is accommodated and a second groove extending from the first groove in a direction crossing that in which the first coupling part is accommodated into the first groove so that coupling of the first coupling part and the second coupling part is completed by an rotational operation of the filter part.

A direction in which the first coupling part is accommodated into the first groove may be a vertical direction, and the second groove may extend from the first groove in a horizontal direction.

An air inlet of the second cyclone unit may be disposed lower than an axis in a longitudinal direction of the suction unit.

The guide unit may further include a cleaning part extending to an inner circumferential surface of the dust container.

The filter part may extend outward from an upper end of the filter part.

The cleaner part may inclinedly extend horizontally or upward from the filter part The cleaning part may have an end coming into contact with an inner circumferential surface of the first dust storage part or disposed adjacent to the inner circumferential surface of the first dust storage unit.

In another embodiment, a cleaner includes: a suction unit guiding air and dust; a main body including a first cyclone unit separating the air and the dust, which are suctioned through the suction unit, from each other and a second cyclone unit separating the dust from the air discharged from the first cyclone unit; a sealing member installed on the second cyclone unit; and a guide unit separably coupled to the main body, The guide unit may cover at least a portion of the second cyclone unit in the state in which the guide unit is coupled to the main body The guide unit may include a contact rib coming into contact with the sealing member in the state in which the guide unit is coupled to the main body.

When the guide unit is separated from the main body, the dust discharge part of the second cyclone unit may be exposed to the outside.

The guide unit may include an opening through which the air primarily separated from the dust in the first cyclone unit passes.

The guide unit may include a dust storage part in which the dust discharged from the second cyclone unit is stored.

In further another embodiment, a cleaner includes: a suction unit guiding air and dust; a main body including a first cyclone unit separating the air and the dust, which are suctioned through the suction unit, from each other and a second cyclone unit separating the dust from the air discharged from the first cyclone unit; and a guide unit disposed in the main body to partition a first dust storage part, in which the dust separated in the first cyclone unit is stored, and a second dust storage part, in which the dust separated in the second cyclone unit is stored, from each other, wherein the guide unit is separably coupled to the main body, and the guide unit includes a cleaning part extending to an inner circumferential surface of the first dust storage part.

Advantageous Effects

According to this embodiment, since a dust discharge part of a second cyclone unit is exposed to the outside when a guide unit guiding air to the second cyclone unit is separated from a main body, the dust discharge part is easily cleaned.

Also, since the guide unit includes a filter part to filter air flowing to the second cyclone unit, the second cyclone unit and the filter part are capable of being cleaned.

According to this embodiment, since there is no component at a near of the first cyclone unit when the guide unit is separated from the main body, the user can easily clean the second cyclone unit.

According to this embodiment, since an air inlet of the second cyclone unit us disposed lower than an axial in a longitudinal direction of the suction part such that the dust discharge part of the second cyclone unit is disposed close to the discharge opening of the dust container, the user can easily clean the second cyclone unit.

According to this embodiment, since a contact rib disposed inside the guide unit comes into contact with a sealing member disposed outside the second cyclone unit in the state in which the guide unit is mounted on the main body, the sealing of a contact portion between the guide unit and the second cyclone unit may be maintained.

According to this embodiment, since the foreign substances are discharged from the dust container while the guide unit is separated from the main body without directly taking out the foreign substances such as the hairs within the dust container or directly cleaning the inner circumferential surface of the dust container, the user's convenience may be improved.

DETAILED DESCRIPTION OF THE EMBODIMENTS

Figure 1:
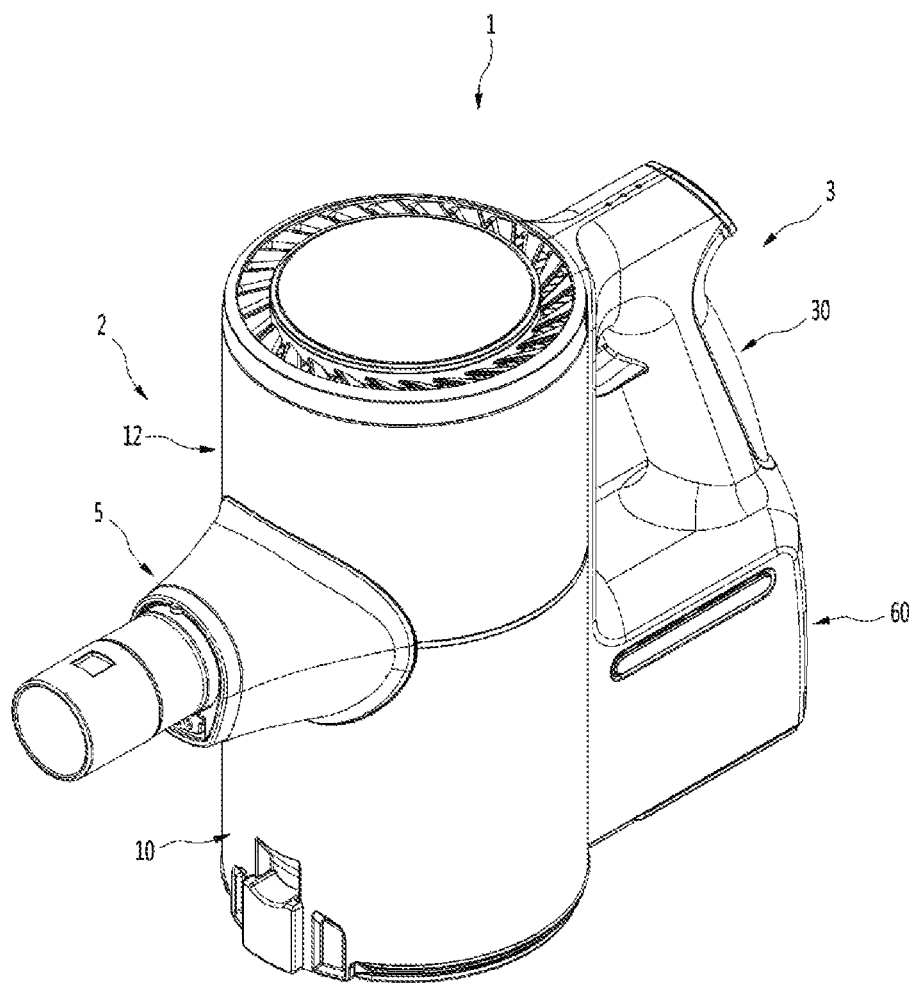
FIG. 1 is a perspective view of a cleaner according to an embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed there between.

Figure 2:
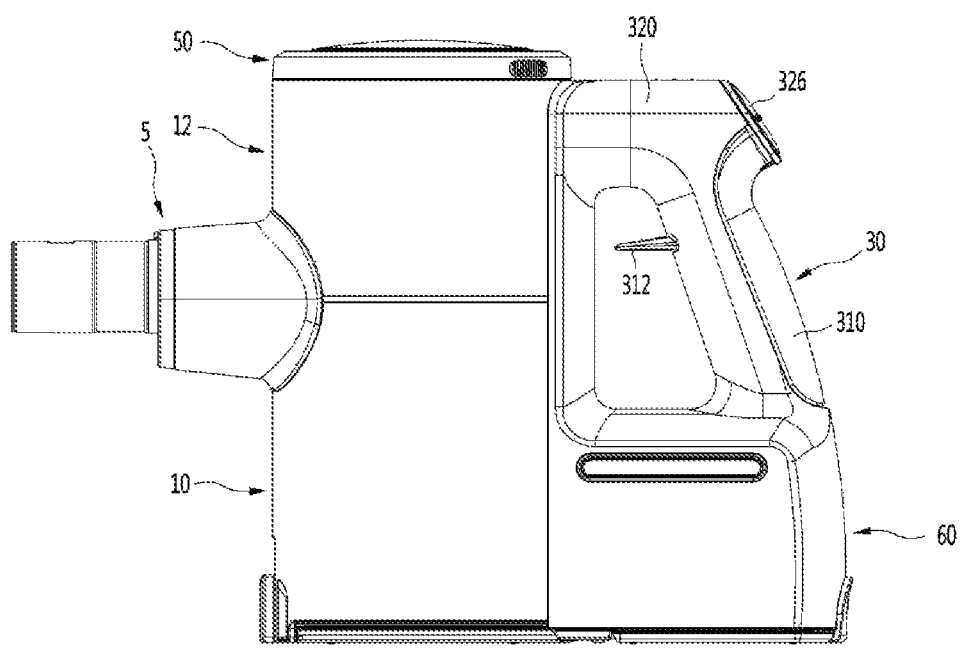
FIG. 2 is a side view of the cleaner according to an embodiment.
Figure 3:
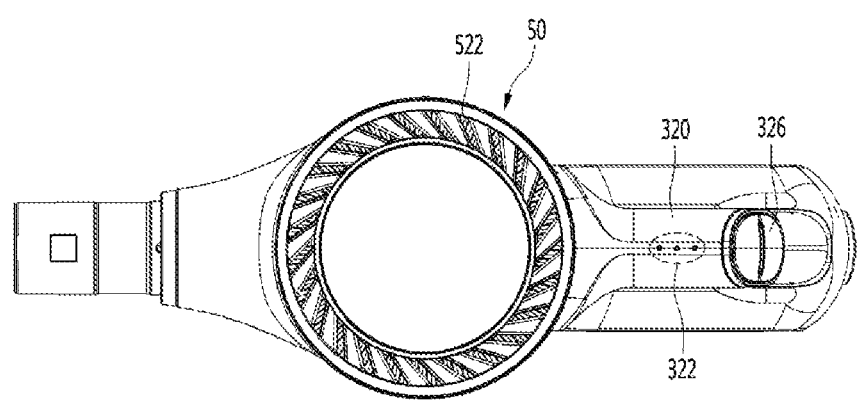
FIG. 3 is a plan view of the cleaner according to an embodiment.
Figure 4:
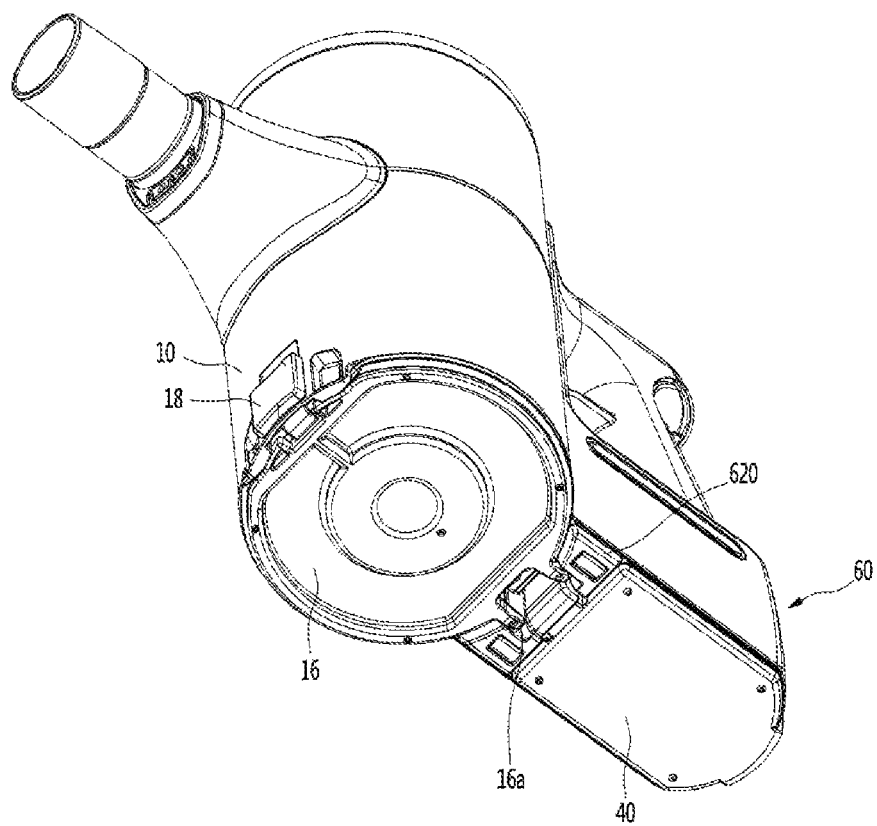
FIG. 4 is a perspective view of the cleaner when viewed from a lower side according to an embodiment.
Figure 5:
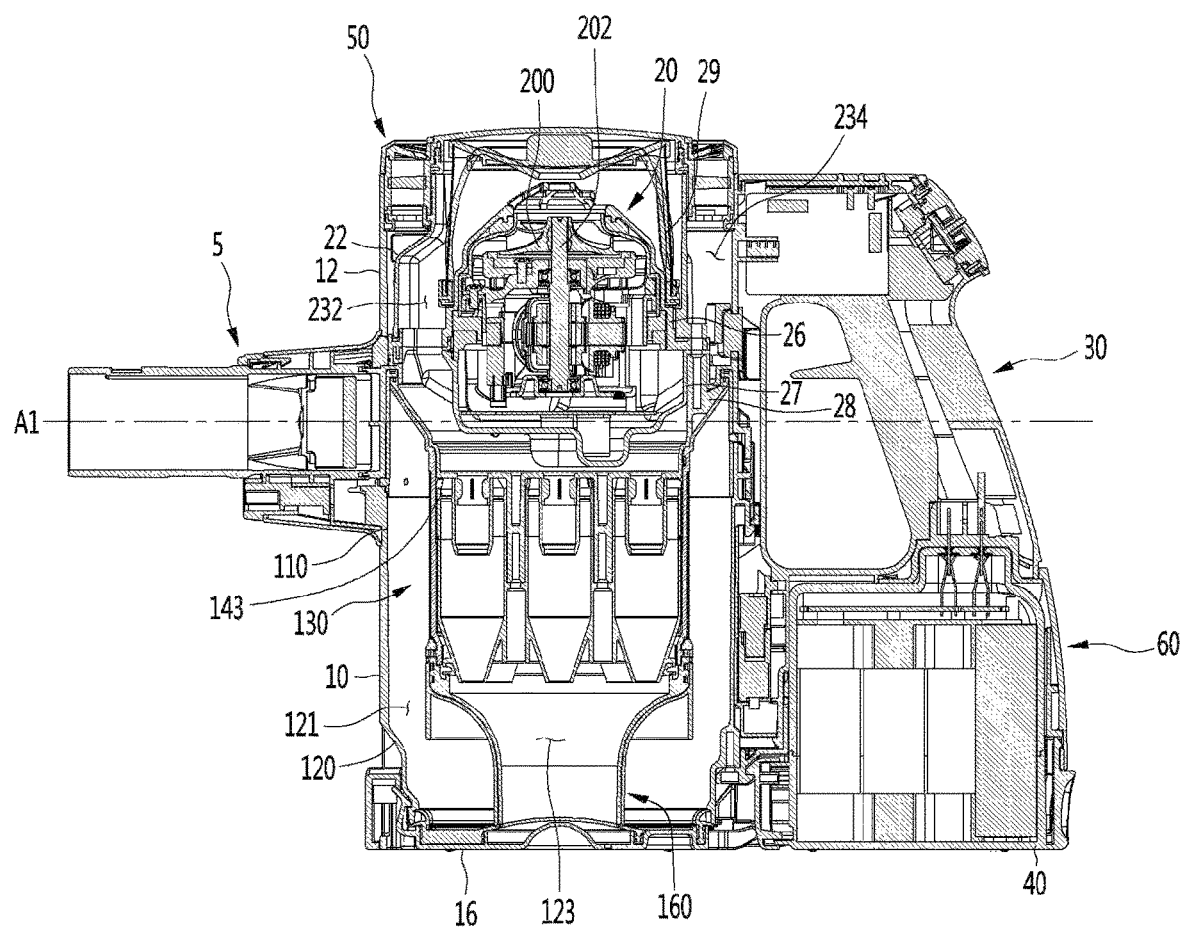
FIG. 5 is a longitudinal cross-sectional view of the cleaner according to an embodiment.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention, FIG. 4 is a perspective view of the cleaner according to an embodiment of the present invention when seen from under the cleaner, and FIG. 5 is a cross-sectional view of the cleaner according to an embodiment of the present invention.

Referring to FIGS. 1 to 5, a cleaner 1 according to an embodiment of the present invention may include a main body 2.

The cleaner 1 may further include a suction unit 5 coupled to the front of the main body 2. The suction unit 5 may guide air containing dust into the main body 2.

The cleaner 1 may further include a handle unit 3 coupled to the main body 2. The handle unit 3 may be positioned opposite to the suction unit 5 on the main body 2.

That is, the main body 2 may be disposed between the suction unit 5 and the handle unit 3.

The main body 2 may include a first body 10 and a second body 12 on the first body 10. The first body 10 and the second body 12 may be directly combined or may be indirectly combined through an intermediate member.

The first body 10 and the second body 12 may be, though not limited thereto, formed in a cylindrical shape.

The first body 10 and the second body 12 are open at the top and the bottom, respectively. That is, the bodies 10 and 12 may have a top opening and a bottom opening, respectively.

The suction unit 5 may be coupled to the main body 2 such that the center of the suction unit 5 is positioned approximately at the boundary between the first body 10 and the second body 12.

The main body 2 may further include a dust separation unit that separates dust from air sucked through the suction unit 5.

The dust separation unit may include a first cyclone unit 110 that may separate dust, for example, using cyclonic flow. The first body 10 includes the first cyclone unit 110 in this configuration.

The air and dust sucked through the suction unit 5 helically flow along the inner side of the first cyclone unit 110.

The axis of the cyclonic flow in the first cyclone unit 110 may vertically extend.

The dust separation unit may further include a second cyclone unit 130 that secondarily separates dust from the air discharged out of the first cyclone unit 110. The second cyclone unit 130 may be disposed inside the first cyclone unit 110 to minimize the size of the dust separation unit.

The first body 10 may further include a dust container 120 that stores dust separated from each of the cyclone units 110 and 130. That is, an upper portion of the first body 10 corresponds to a first cyclone unit 110, and a lower portion of the first body 10 corresponds to the dust container 120.

The main body 2 may further include a body cover 16 for opening/closing the bottom of the first body 10. The body cover 16 may open/close the first body 10 by being rotated. A button 18 for rotating the body cover 16 may be disposed on the first body 10. A hinge 162a of the body cover 16 may be coupled to hinge coupling portions 620 of the battery housing 60.

At least a portion of the second cyclone unit 130 may be positioned inside the first body 10.

The main body 2 may further include a guide unit disposed in the first body 10.

The guide unit 160 may guide air separated from the dust in the first cyclone unit 110 to the second cyclone unit 130.

Also, the guide unit 160 may filter the air flowing from the first cyclone unit 110 to the second cyclone unit 130.

Also, the guide unit 160 may store the dust separated from the second cyclone unit 130.

The guide unit 160 may surround the second cyclone unit 130 and come into contact with a top surface of the body cover 16. That is, one portion of the guide unit 160 may be disposed between the second cyclone unit 130 and the first cyclone unit 110, and the other portion of the guide unit 160 may be disposed between a lower portion of the second cyclone unit 130 and the body cover 16.

The guide unit 160 may partition an inner space of the first body 10 into a first dust storage part 121 in which the dust separated from the first cyclone unit 110 is stored and a second dust storage part 123 in which the dust separated from the second cyclone unit 130 is stored.

A space defined by the guide unit 160 corresponds to the second dust storage part 123, and a space between the guide unit 160 and the first body 10 corresponds to the first dust storage part 121.

The body cover 16 may open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an outlet of the second cyclone unit 130.

To this end, the main body 2 may further include a discharge guide 28 connected to the second cyclone unit 130 and a flow guide 22 that communicates with the discharge guide 28.

For example, the discharge guide 28 is disposed on the second cyclone unit 130 and the flow guide 22 is disposed over the discharge guide 28.

Further, at least a portion of the suction motor 20 is positioned inside the flow guide 22.

Accordingly, the axis of the cyclonic flow in the first cyclone unit 110 may pass through the suction motor 20.

When the suction motor 20 is disposed over the second cyclone unit 130, the air discharged from the second cyclone unit 130 may flow directly to the suction motor 20, so the channel between the dust separation unit and the suction motor 20 may be minimized.

The suction motor 20 may include a rotary impeller 200. The impeller 200 may be fitted on a shaft 202. The shaft 202 is vertically disposed.

An extension line from the shaft 202 (which may be considered as the rotational axis of the impeller 200) may pass through the first body 10. The rotational axis of the impeller 200 and the axis of the cyclonic flow in the first cyclone unit 110 may be on the same line.

According to the present invention, there is the advantage that the path through which the air discharged from the dust separation unit, that is, the air discharged upward from the second cyclone unit 190 flows to the suction motor 20 may be reduced and a change in direction of air may be decreased, so a loss of airflow may be reduced.

As the loss of airflow is reduced, suction force may be increased and the lifetime of the battery 40 for supplying power to the suction motor 20 may be increased.

The cleaner 1 may further include an upper motor housing 26 covering a portion of the top of the suction motor 20 and a lower motor housing 27 covering a portion of the bottom of the suction motor 20.

The suction motor 20 may be disposed inside the motor housings 26 and 27 and the flow guide 22 may be disposed to cover the upper motor housing 26.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

The air discharged from the second cyclone unit 190 flows to the suction motor 20 through the first air passage 232 and the air discharged from the suction motor 20 flows through the second air passage 234 and is then discharged outside. Accordingly, the second air passage 234 functions as an exhaust channel.

The handle unit 3 may include a handle 30 for a user to hold and a battery housing 60 under the handle 30.

The handle 30 may be disposed behind the suction motor 20.

As for directions, with respect to the suction motor 20 in the cleaner 1, the direction in which the suction unit 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to the present invention, since the suction motor 20 that is heavy is disposed ahead of the handle 30 and the battery 40 that is heavy is disposed behind the handle 30, so weight may be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend. In the present invention, the first extension 310, which is a portion that a user may hold (a portion that a user's palm may come in contact with), may be referred to as a grip part.

A stopper 312 for preventing a user's hand holding the first extension 310 from moving in the longitudinal direction of the first extension 310 (vertically in FIG. 2) may be formed on the first extension 310. The stopper 312 may extend toward the suction unit 5 from the first extension 310.

The stopper 312 is spaced apart from the second extension 320. Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction unit 5 may pass through the user's wrist.

When the longitudinal axis A1 of the suction unit 5 passes through the user's wrist and the user's arm is stretched, the longitudinal axis A1 of the suction unit 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input instructions to turn on/off the cleaner (suction motor) through the operation unit 326. For example, it is possible to input instructions to turn on/off the suction motor through the operation unit 326. Further, it is possible to control the intensity of the suction force of the suction motor 20 that has been turned on through the operation unit 326.

The operation unit 326 may be disposed to face a user. The operation unit 326 may be disposed opposite to the stopper 312 with the handle 30 therebetween.

The operation unit 326 is positioned higher than the stopper 312. Accordingly, a user may easily operate the operation unit 326 with his/her thumb with the first extension 310 in his/her hand.

Further, since the operation unit 326 is positioned outside the first extension 310, it is possible to prevent the operation unit 326 from being unexpectedly operated when a user cleans with the first extension 310 in his/her hand.

The battery housing 60 may be disposed under the first extension 310.

The battery 40 may be detachably combined with the battery housing 60.

For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 may be shown like a single unit.

When the battery 40 is inserted in the battery housing 60, the bottom of the battery 40 may be exposed to the outside. Accordingly, when the cleaner 1 is placed on the floor, the battery 40 may be in contact with the floor.

According to this structure, there is the advantage that the battery 40 may be directly separated from the battery housing 60.

Further, since the bottom of the battery 40 is exposed to the outside, the bottom of the battery 40 may come in direct contact with the air outside the cleaner 1, so the battery 40 may be more efficiently cooled.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged. Accordingly, the air exit 522 may be arranged in a ring shape.

The filter unit 50 may be detachably coupled to the top of the main body 2.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user may easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 26 and may surround a portion of the upper motor housing 26. That is, the upper motor housing 26 may include a filter support for supporting the pre-filter 29.

Figure 6:
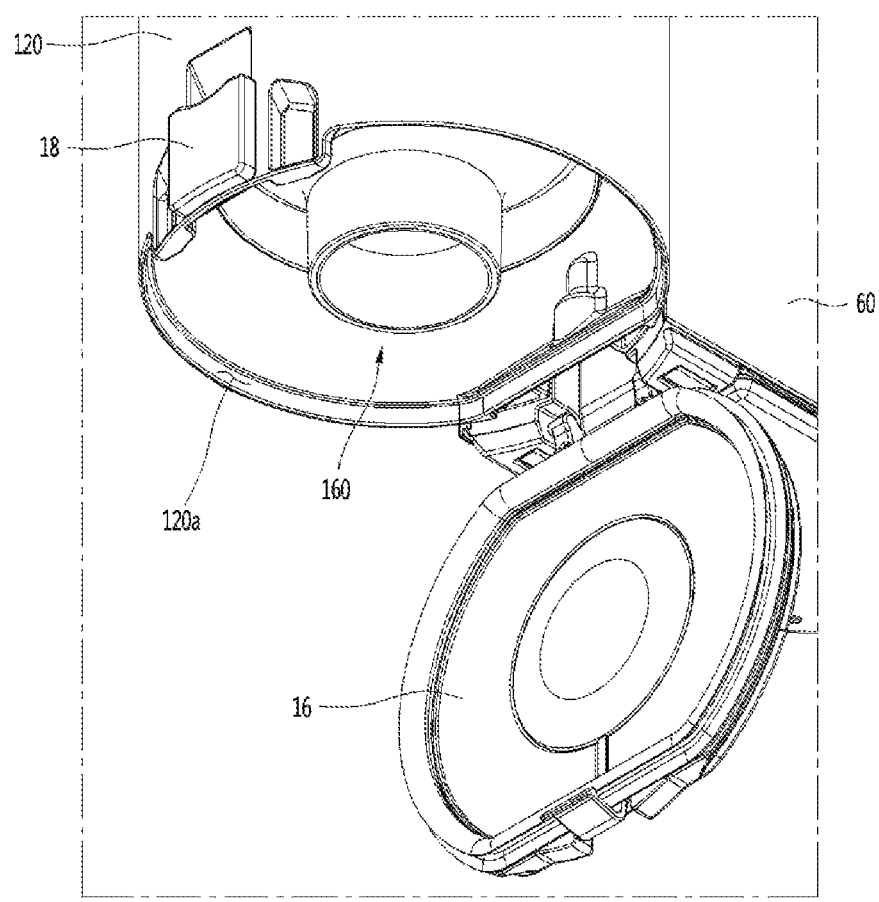
FIG. 6 is a view illustrating a state in which a body cover rotates according to an embodiment.
Figure 7:
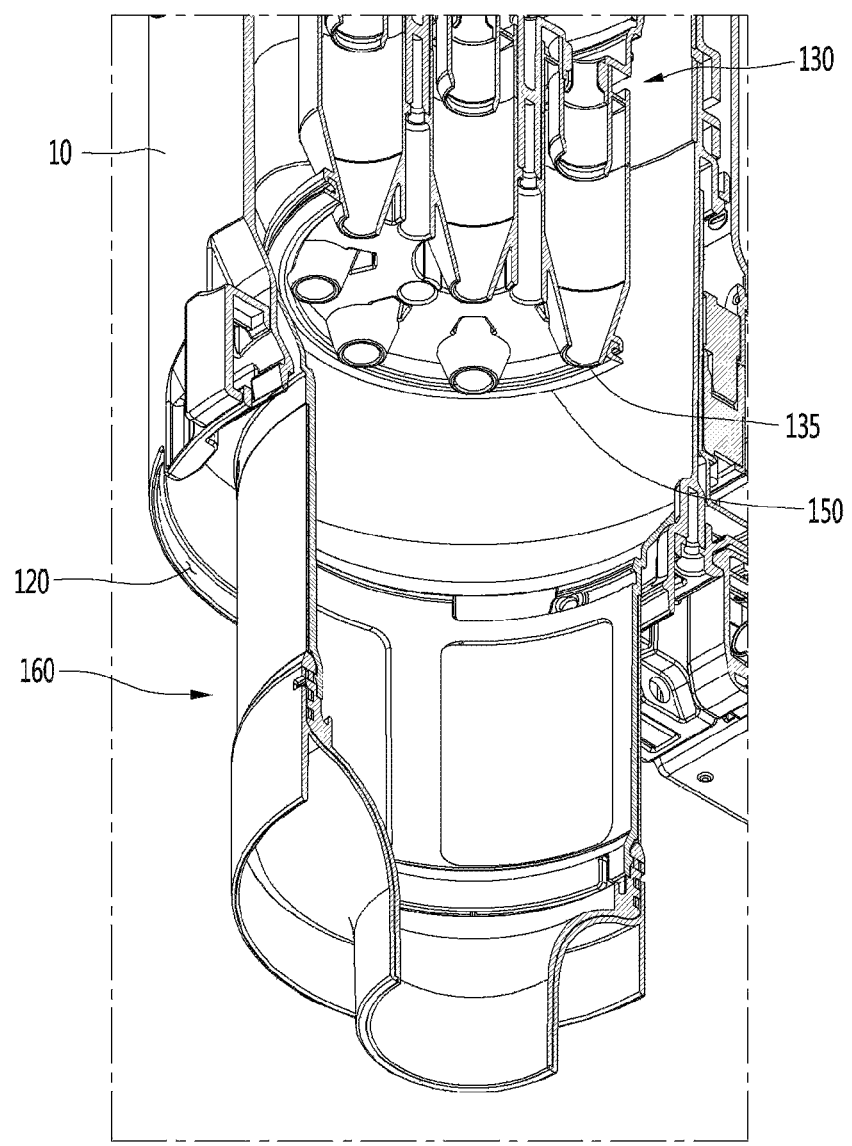
FIG. 7 is a view illustrating a process of separating a guide unit from a main body according to an embodiment.
Figure 8:
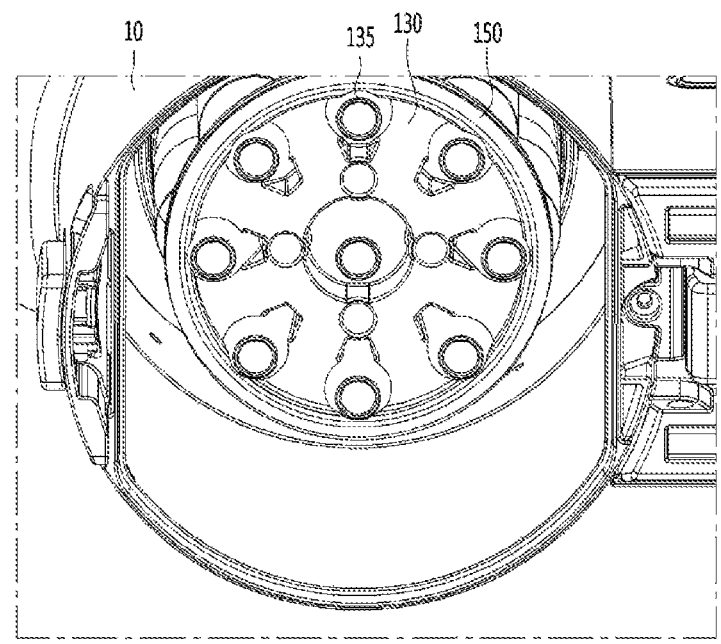
FIG. 8 is a view illustrating a state in which the guide unit is separated from the main body.

FIG. 6 is a view illustrating a state in which the body cover rotates according to an embodiment, FIG. 7 is a view illustrating a process of separating the guide unit from the main body according to an embodiment, and FIG. 8 is a view illustrating a state in which the guide unit is separated from the main body.

Referring to FIGS. 4 to 8, when the button 18 is manipulated to rotate the body cover 16, the body cover 16 rotates about a hinge 16a to open a lower side of the dust container 120.

When the body cover 16 opens the lower side of the dust container 120, the guide unit 160 surrounding the second cyclone unit 130 is exposed to the outside.

Since the guide unit 160 is seated on the body cover 16 in a state in which the body cover 16 closes the dust container 120, when the body cover 16 opens the dust container 120, the lower portion of the guide unit 160 is disposed close to a discharge opening 120a of the dust container 120. Here, the discharge opening 120a may be a portion through which dust is discharged to empty the dust in the dust container 120.

Thus, the user may separate the guide unit 160 from the main body 2 in a state in which the user grasps the guide unit 160 through the discharge opening 120a.

The guide unit 160 may be separated to the outside of the main body 2 through the discharge opening 120a. When the guide unit 160 is separated from the main body 2, the dust discharge part 135 of the second cyclone unit 130 may be exposed to the outside.

When the guide unit 160 is separated from the main body 2, there is no component between the second cyclone unit 130 and the first body 10.

Thus, the user may easily clean the dust discharge part 135 of the second cyclone unit 130 in the state in which the second cyclone unit 130 is disposed in the main body 2.

According to this embodiment, since the dust discharge part 135 is cleaned, the dust discharge part 135 may be prevented from being blocked or maintained in the blocked state to prevent dust separation performance from being deteriorated.

The second cyclone unit 130 is disposed to stand up on the main body 2.

In this embodiment, an air inlet 143 of the second cyclone unit 130 may be disposed lower than an axial in a longitudinal direction of the suction part. In this case, the dust discharge part 135 of the second cyclone unit 130 may be disposed close to the discharge opening 120a of the dust container 120.

Thus, the user may easily clean the dust discharge part 135 of the second cyclone unit 130, which is disposed close to the discharge opening 120a.

A sealing member 150 for sealing may be disposed at a position that is adjacent to the dust discharge part 135 of the second cyclone unit 130.

Figure 9:
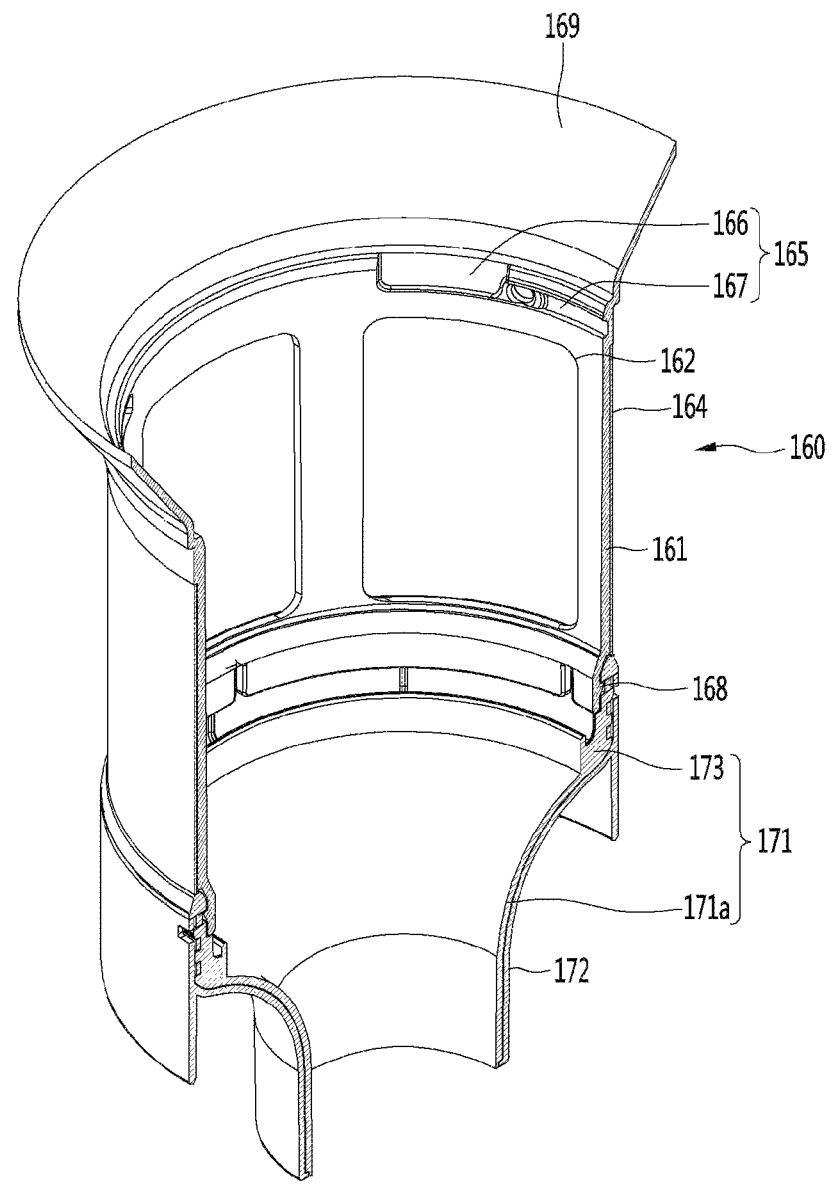
FIG. 9 is a cross-sectional perspective view of the guide unit according to an embodiment.
Figure 10:
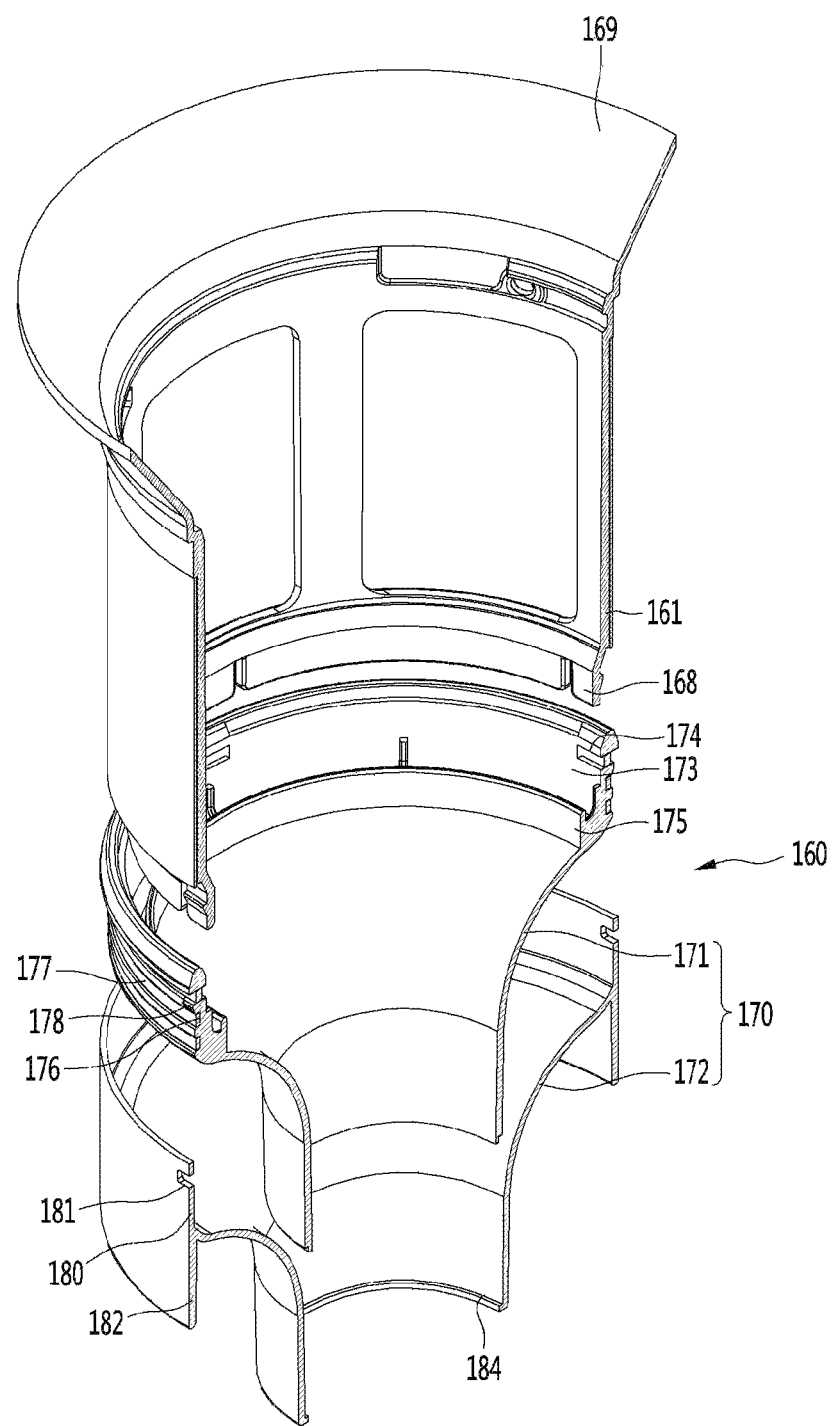
FIG. 10 is an exploded cross-sectional perspective view of the guide unit of FIG. 9.
Figure 11:
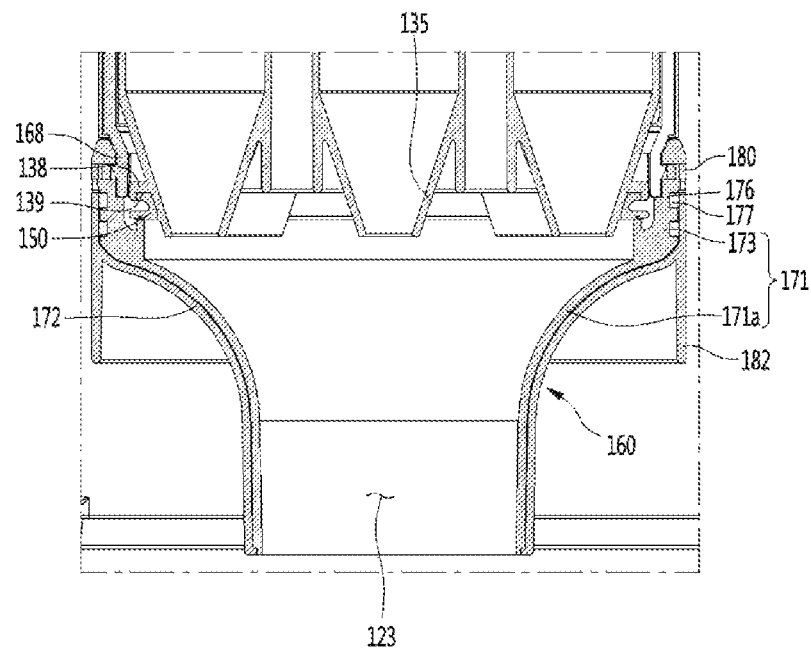
FIG. 11 is a view illustrating a state in which the guide unit comes into contact with a sealing member.
Figure 12:
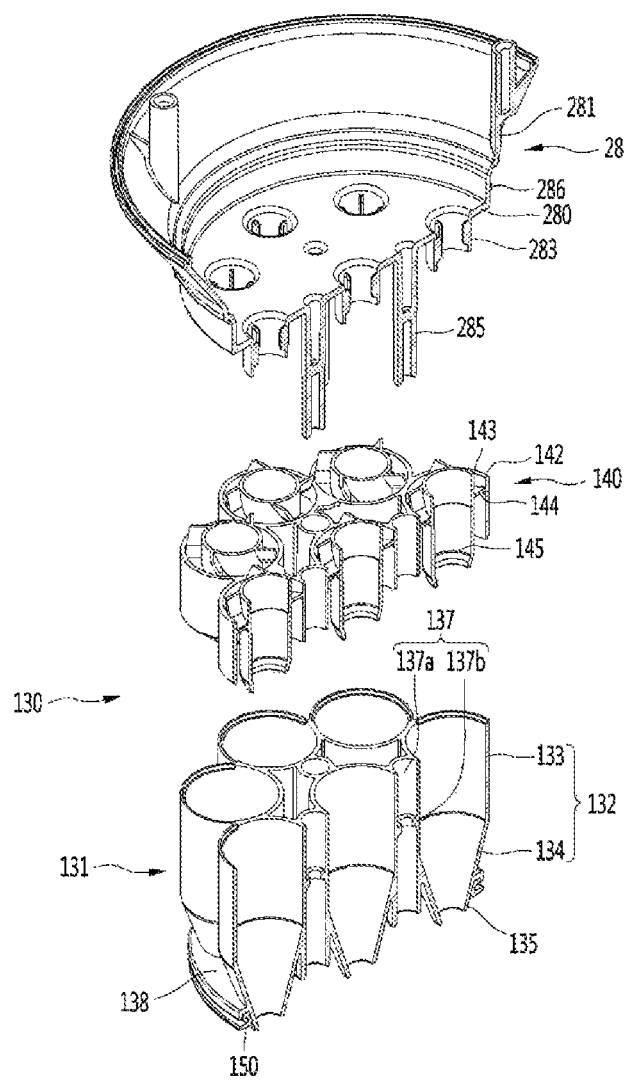
FIG. 12 is a view of a second cyclone unit and a discharge guide.
Figure 13:
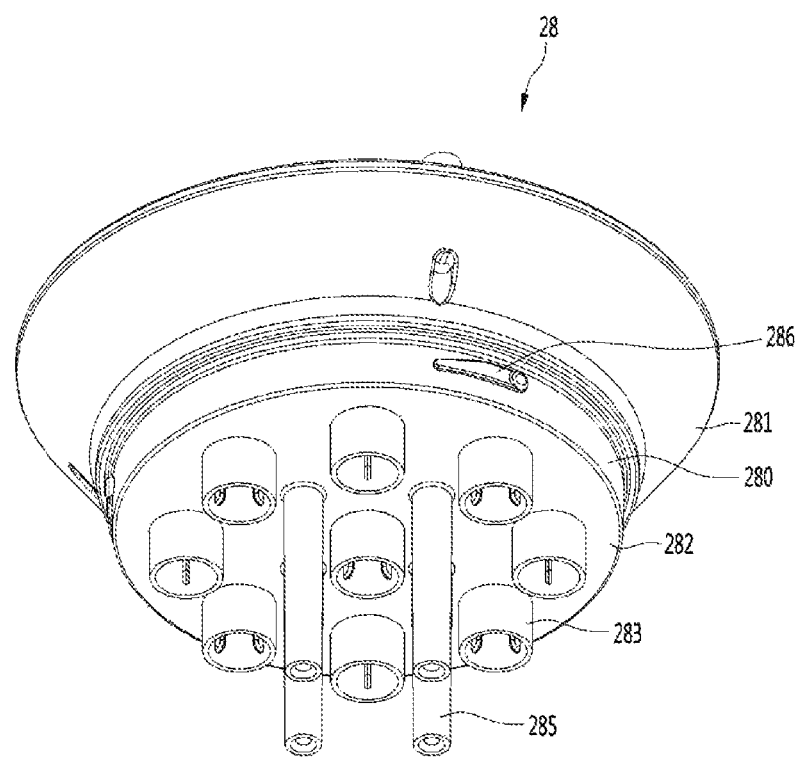
FIG. 13 is a perspective view of the discharge guide according to an embodiment.

FIG. 9 is a cross-sectional perspective view of the guide unit according to an embodiment, FIG. 10 is an exploded cross-sectional perspective view of the guide unit of FIG. 9, FIG. 11 is a view illustrating a state in which the guide unit comes into contact with the sealing member, FIG. 12 is a view of the second cyclone unit and the discharge guide, and FIG. 13 is a perspective view of the discharge guide according to an embodiment.

Referring to FIGS. 9 to 13, the guide unit 160 may include a filter part 161 for filtering air and a storage unit 170 for storing dust.

The filter part 161 may include a plurality of openings 162 of which at least a portion has a cylindrical shape and through which air passes in a circumferential direction.

Also, the filter part 161 may include a mesh 164 surrounding the plurality of openings 162. Thus, air primarily separated from dust in the first cyclone unit 110 may be filtered while the air passes through the mesh 164.

The filter part 161 may include a first coupling part 165 to be coupled to the discharge guide 28.

The first coupling part 165 may be disposed on an inner circumferential surface of the filter part 161. The first coupling part 165 may include a first groove 166 extending downward from an upper end of the filter part 161 and a second groove 167 extending from the first groove 166 in a horizontal direction. That is, the first coupling part 165 may have an "L" shape.

The filter part 161 may further include a coupling hook 168 to be coupled to the storage unit 170. The coupling hook 168 may be disposed on a power portion of the filter part 161.

The filter part 161 may further include a cleaning part 169 for discharging foreign substances such as hairs within the dust container 120 from the dust container 120 when the guide unit 160 is separated from the dust container 120.

For example, the cleaning part 169 may be disposed on an upper end of the filter part 161.

The cleaning part 169 may extend from the upper end of the filter part 161 in the horizontal direction or inclinedly extend upward.

The cleaning part 169 may be continuously formed on the filter part 161 in a circumferential direction, or a plurality of cleaning parts 169 may be arranged to be spaced apart from each other in the circumferential surface of the filter part 161.

An end of the cleaning part 169 may come into contact with an inner circumferential surface of the dust container 120 (or an inner circumferential surface of the second dust storage part) or be disposed adjacent to the inner circumferential surface of the dust container 120. The cleaning part 169 may be integrated with the filter part 161 or be coupled to the filter part 161.

For another example, a contact part (not shown) made of a rubber material to come into contact with the inner circumferential surface of the dust container 120 may be disposed on the end of the cleaning part 169. The contact part may clean the inner circumferential surface of the dust container 120 while the guide unit 160 is separated from the main body 2.

Although not shown, a cutout groove or slot for preventing the manipulation button 18 from interfering with a portion of the dust container 120, on which the manipulation button 18 is installed, while the guide unit 160 is separated may be defined in the cleaning part 169.

A portion or the whole of the dust container may be made of a transparent or translucent material. When the contact part cleans the inner circumferential surface of the dust container 120 while the user separates the guide unit 160 from the main body 2, the inner circumferential surface of the dust container 120 may be cleaned so that the user easily confirm the inside of the dust container 120 by using his/her naked eyes.

The storage unit 170 may support a lower portion of the filter part 161. The storage unit 170 may include an inner body 171 and an outer body 172 surrounding the inner body 171.

The inner body 171 may include a first portion 171a defining the second dust storage part 123. The first portion 171a of the inner body 171 may have a diameter that gradually decreases downward.

When the first portion 171a of the inner body 171 has the diameter that gradually decreases downward, the first dust storage part 121 may increase in capacity within the dust container 120.

A relatively large volume of dust may be stored in the first dust storage part 121. If the first dust storage part 121 increases in capacity, a time taken to fully fill dust in the first dust storage part 121 may increase to reduce the number of operations for emptying dust.

The inner body 171 may further include a second portion 173 disposed on an upper portion of the first portion 171a.

For example, the second portion 173 of the inner body 171 may have a cylindrical shape. A portion of a lower portion of the filter part 161 may be inserted into the second portion 173 of the inner body 171.

The inner body 171 may further include a hook coupling part 174 to be coupled to the coupling hook 168. For example, the hook coupling part 174 may be disposed on the second portion 173.

The hook coupling part 174 may be a groove defined in the inner circumferential surface of the second portion of the inner body 171 or a hole passing through the second portion 173.

The inner body 171 may further include a contact rib 175 for coming into contact with the sealing member 150 disposed on the second cyclone unit 130. The contact rib 175 may have a ring shape.

The contact rib 175 may be disposed on the first portion 171a or the second portion 173 of the inner body 171 or disposed on a boundary between the first portion 171a and the second portion 173 of the inner body 171.

At least one sealer 177 for the sealing between the inner body 171 and the outer body 172 may be coupled to the outer circumferential surface of the second portion 173 of the inner body 171. The sealer 177 may have a ring shape. A sealer seating groove 176 in which the sealer 177 is seated may be defined in the outer circumferential surface of the second portion 173 of the inner body 171.

FIG. 10 illustrates an example in which the plurality of sealers 177 are coupled to the outer circumferential surface of the inner body 171. In this case, the plurality of sealers 177 may be disposed to be spaced apart from each other in a vertical direction.

At least one fixing protrusion for fixing the outer body 172 may be disposed on the outer circumferential surface of the second portion 173 of the inner body 171.

A portion of the outer body 172 may have the same shape as the first portion 171a of the inner body 171 to surround the outside of the first portion 171a of the inner body 171.

A support rib 184 supporting a lower end of the first portion 171a of the inner body 171 may be disposed on a lower portion of the outer body 172.

The outer body 172 may further include a cover part 180 disposed outside the inner body 171 to surround the second portion 173 of the inner body 171. The cover part 180 may have a cylindrical shape.

A protrusion coupling part 181 to which the at least one fixing protrusion 178 is fixed may be disposed on the cover part 180.

The at least one sealer 177 is disposed between the cover part 180 and the second portion 173 of the inner body 171. Thus, dust and/or air within the second dust storage part 123 may be prevented from being introduced between the inner body 171 and the outer body 172 by the at least one sealer 177.

Also, dust and/or air within the first dust storage part 121 may be prevented from being introduced between the inner body 171 and the outer body 172 by the at least one sealer 177.

The outer body 172 may further include a scattering prevention rib 182 extending from the outer body 172 in an opposite direction to the cover part 180.

For example, the scattering prevention rib 182 may have a cylindrical shape and extend downward from one point of the outer body 172.

Since a portion of the outer body 172 decreases in diameter downward, a space may be defined between the outer circumferential surface of the outer body 172 and the scattering prevention rib 182.

A cyclone flow in the first cyclone unit 110 may descend while flowing along the inner circumferential surface of the first body 10. When the cyclone flow collides with the body cover 16 while the cyclone flow descends, a rotational flow may be changed into an ascending flow.

If the ascending flow exists in the first dust storage part 121, the dust stored in the first dust storage part 121 may be scattered to cause a backflow toward the first cyclone unit 110.

In this embodiment, the ascending flow in the first dust storage part 121 is changed again into the descending flow by the scattering prevention rib 182 in the space between the scattering prevention rib 182 and the outer circumferential surface of the outer body 172. Thus, the dust stored in the first dust storage part 121 may be prevented from being scattered, and thus, the dust may be prevented from flowing backward to the first cyclone unit 110.

Since the scattering prevention rib 182 extends downward from the one point of the outer body 172, the dust separated in the first cyclone unit 110 together with the cyclone flow may smoothly move to the first dust storage part 121 by the scattering prevention rib 182.

The second cyclone unit may further include a cyclone module 131 and a guide module 140 connected to the cyclone module 131.

The cyclone module 131 may include a plurality of cyclone bodies 132. The plurality of cyclone bodies 132 may be integrated with each other.

Although not limited, in the plurality of cyclone bodies 132, one cyclone body may be disposed at a central portion, and other cyclone bodies may be disposed to surround the cyclone body that is disposed at the central portion.

For example, although eight cyclone bodies surround the cyclone body that is disposed at the central portion, the present disclosure is not limited to the number of cyclone bodies.

In this specification, the central cyclone body may be called an inner cyclone body, and the cyclone bodies disposed to surround the inner cyclone body are called outer cyclone bodies.

Each of the cyclone bodies 132 may include a first cyclone body 133 and a second cyclone body 134 extending downward from the first cyclone body 133.

For example, the first cyclone body 133 may have a cylindrical shape, and the second cyclone body 134 may have a cone or truncated cone shape.

The second cyclone body 134 may include the dust discharge part 135 through which dust is discharged.

The cyclone module 131 may further include a guide coupling part 137 to be coupled to the discharge guide 28.

The guide coupling part 137 may be disposed between a portion of the plurality of outer cyclone bodies and the inner cyclone body.

The guide coupling part 137 may include an accommodation part 137a accommodating a coupling body 285 provided on the discharge guide 28 and a body seating part 137b on which the coupling body 285 accommodated in the accommodation part 137a is seated.

In the state in which the coupling body 285 is seated on the body seating part 137b, a coupling member such as a screw may couple the body seating part 137b to the coupling body 285 at a lower portion of the body seating part 137b.

The guide module 140 may be seated on an upper portion of the cyclone module 131 to guide air to each of the cyclone bodies 132, and the air separated from the dust in each of the cyclone bodies 132 may be guided to the discharge guide 28.

The guide module 140 may include a guide body 142 having an air inlet 143. The guide body 142 may have a cylindrical shape with the same diameter as that of the first cyclone body 133.

The guide module 140 may further include an air outlet 145 disposed inside the guide body 142.

The air outlet 145 may have a cylindrical shape. Also, the air outlet 145 may have a vertical length greater than that of the guide body 142.

Thus, when the guide module 140 is seated on the upper portion of the cyclone module 131, a portion of the air outlets 145 of the guide module 140 may be inserted into each of the cyclone bodies 132.

Also, the air may be introduced into the guide body 142 in an axial direction. A spiral flow guide rib 144 for guiding a flow of air may be disposed between an inner circumferential surface of the guide body 142 and the air outlet 145 so that the air introduced into the guide body 142 in the axial direction helically flows along the inner circumferential surface of the cyclone body 132.

According to this embodiment, since the air flows to the guide body 142 in the axial direction, the guide module 140 may be prevented from increasing in width.

Also, since the air outlet 145 of the guide module 140 is inserted into the cyclone body 132, a phenomenon in which the air introduced into the cyclone body 132 is directly discharged without being separated from the dust may be reduced.

The discharge guide 28 may include a first discharge guide 280 seated on the upper portion of the guide module 140 and a second discharge guide 281 extending upward from the first discharge guide 280.

For example, the first discharge guide 280 may have a cylindrical shape. The second discharge guide 281 may have a truncated cone shape that increases in diameter upward.

The first discharge guide 280 may include the coupling body 285 to be coupled to the cyclone module 131. The coupling body 285 may protrude downward from a bottom surface 282 of the first discharge guide 280. The coupling body 285 may have a vertical length greater than that of the guide module 140 so that the coupling body 285 is coupled to the cyclone module 131.

Thus, the coupling body 285 may pass through the guide module 140 from an upper side of the guide module 140 and then be accommodated into the accommodation part 137*a* of the cyclone module 131.

The first discharge guide 280 may include an outlet guide 283 inserted into the air outlet 145 of the guide module 140. The outlet guide 283 may come into contact with an inner circumferential surface of the air outlet 145 to guide the discharge of the air and also prevent the air from leaking between the outer circumferential surface of the outlet guide 283 and the inner circumferential surface of the air outlet 145.

The filter part 161 may be coupled to the first discharge guide 280. The first discharge guide 280 may include a second coupling part 286 to be coupled to the filter part 161.

The second coupling part 286 may be a protrusion that protrudes from an outer circumferential surface of the first discharge guide 280 and extend by a predetermined length in a horizontal direction.

However, the second coupling part 286 may have a horizontal length less than that of the first groove 166.

Since the first discharge guide 280 has a cylindrical shape, the guide unit 160 may be coupled to the discharge guide 28, or the coupling between the guide unit 160 and the discharge guide 28 may be released through a rotational operation of the guide unit 160 by the first coupling part 165 of the filter part 161 and the second coupling part 286 of the discharge guide 28.

Particularly, in order to separate the guide unit 160 from the discharge guide 28, the second coupling part 286 is aligned with the first groove 166 of the first coupling part 165.

In this state, the second coupling part 286 is inserted into the first groove 166. Thus, the second coupling part 286 and the second groove 167 are aligned with each other in the first groove 166. In this state, when the guide unit 160 rotates in one direction, the second coupling part 286 is inserted into the second groove 167 to complete the coupling between the filter part 161 of the guide unit 160 and the discharge guide 28.

Here, the first groove 166 may have a recessed depth greater than that of the second groove 167 so that coupling force between the filter part 161 and the discharge guide 28 increases.

Also, the first groove 166 may have a recessed depth equal to or less than a protruding thickness of the second coupling part 286.

In this case, while the second coupling part 286 disposed in the first groove 166 moves to the second groove 167, contact frictional force between the second coupling part 286 and the second groove 167 may increase to increase the coupling force between the filter part 161 and the discharge guide 28.

The cyclone module 131 may further include a sealing member coupling part 138 to be coupled to the sealing member 150. The sealing member coupling part 138 may be disposed adjacent to the dust discharge part 135 on the cyclone body 132.

For example, the sealing member coupling part 138 may be integrated with the second cyclone body 134.

Also, the sealing member coupling part 138 may be disposed above the dust discharge part 135. That is, the sealing member coupling part 138 may be disposed in a shape in which the dust discharge part 135 passes through the sealing member coupling part 138.

A sealing member fitting groove 139 into which the sealing member 150 is fitted may be defined in a lower portion of the sealing member coupling part 138. The sealing member 150 may have a ring shape. In the state in which the sealing member 150 is fitted into the sealing member fitting groove 139, the sealing member 150 surrounds a circumference of the cyclone module 131.

As illustrated in FIG. 11, when the filter part 161 of the guide unit 160 is coupled to the discharge guide 28, the contact rib 175 of the storage unit 170 may come into contact with a bottom surface of the sealing member 150 of the second cyclone unit 130. Here, in the state in which the contact rib 175 comes into contact with the bottom surface of the sealing member 150, the dust discharge part 135 of the second cyclone unit 130 may be disposed in a region defined by the contact rib 175.

When the filter part 161 of the guide unit 160 is coupled to the discharge guide 28 to increase the contact force between the sealing member 150 and the contact rib 175, the contact rib 175 of the storage unit 170 may press the sealing member 150.

When the contact rib 175 comes into contact with the sealing member 150, an inner space of the guide unit 160 may be partitioned into an upper space and a lower space of the sealing member 150.

Here, the upper space of the sealing member 150 may be a space through which the air separated from the dust in the first cyclone unit 110 is guided to the air inlet 143 of the second cyclone unit 130, and the lower space of the sealing member 150 may be a space within the second dust storage part 123.

According to this embodiment, when the guide unit 160 includes the filter part 161 and is separated from the main body 2, since the dust discharge part 135 of the second cyclone unit 130 is exposed to the outside, the dust discharge part 135 of the second cyclone unit 130 may be easily cleaned, and also, the filter part 161 may be easily cleaned.

Also, in the state in which the guide unit 160 is mounted on the main body 2, the contact rib 175 disposed inside the guide unit 160 comes into contact with the sealing member 150 disposed outside the second cyclone unit 130. Thus, the sealing between the inner space of the first dust storage part 121, the inner space of the first cyclone unit 110, or the space through which the air is guided from the guide unit 160 to the second cyclone unit 130 and the inner space of the second dust storage part may be maintained.

Thus, the dust stored in the second dust storage part 123 may be prevented from being scattered through the maintenance of the sealing, and the air introduced into the guide unit 160 may be prevented from being directly discharged to the air outlet without undergoing the dust separation process by the cyclone body 132 of the second cyclone unit 130.

Figure 14:
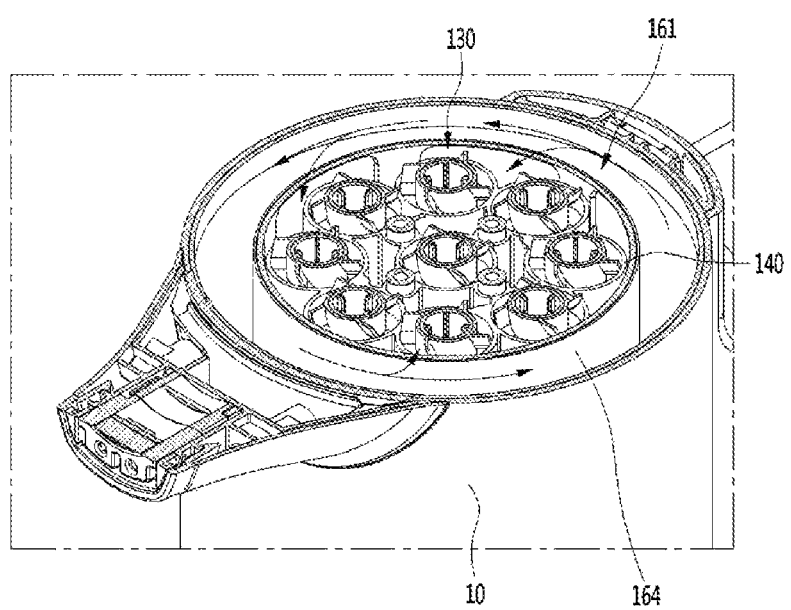
FIG. 14 is a transverse cross-sectional view of a cleaner to show an air flow in the cleaner according to an embodiment.
Figure 15:
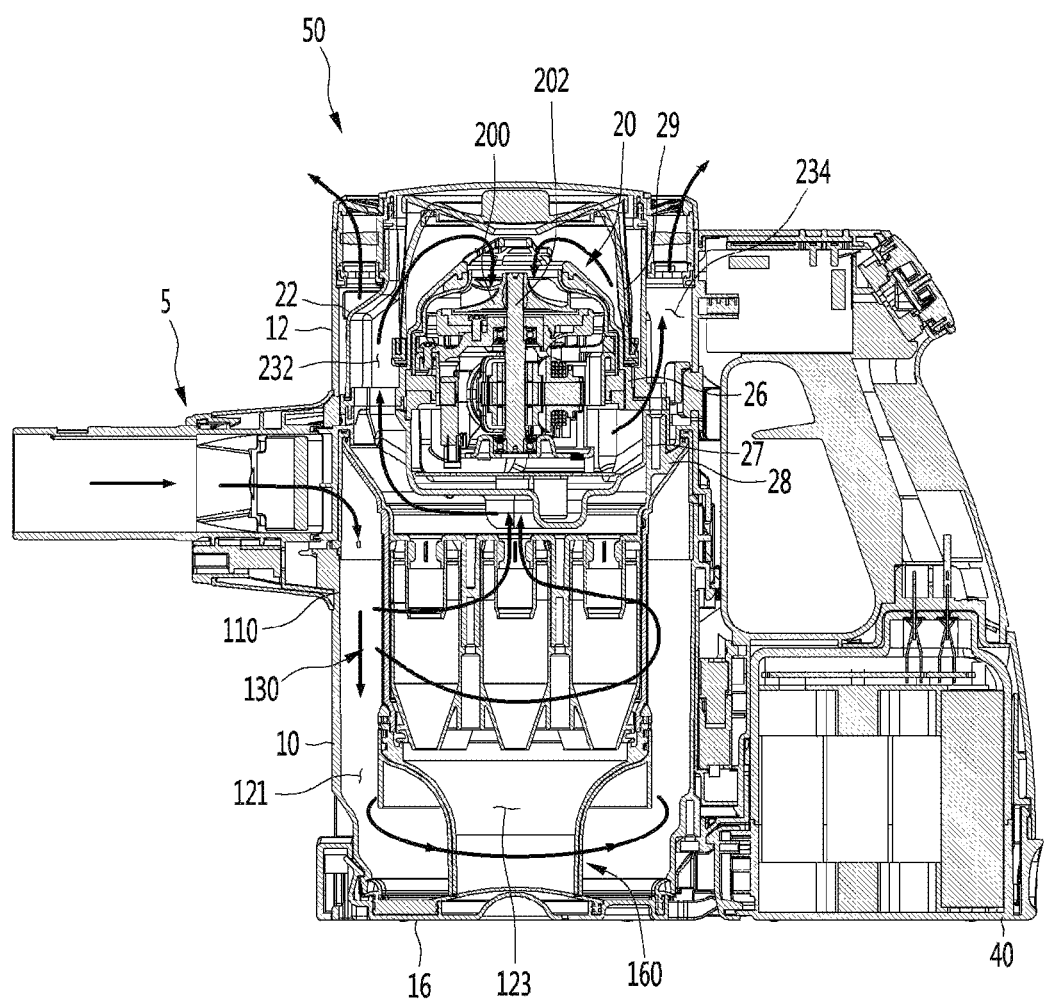
FIG. 15 is a longitudinal cross-sectional view of the cleaner to show an air flow in the cleaner according to an embodiment.

FIG. 14 is a transverse cross-sectional view of the cleaner to show an air flow in the cleaner according to an embodiment, and FIG. 15 is a longitudinal cross-sectional view of the cleaner to show an air flow in the cleaner according to an embodiment.

Referring to FIGS. 9 to 15, air and dust suctioned through the suction unit 5 by an operation of the suction motor 20 are separated from each other while flowing along the inner circumferential surface of the first cyclone unit 110.

The dust separated from the air may flow downward and then be stored in the first dust storage part 121. The air separated from the dust may pass through the filter part 161 of the guide unit 160 and then flow to the air inlet 143 of the second cyclone unit 130. Here, an upper end of the mesh 164 of the filter part 161 may be disposed higher than the air inlet 143 of the second cyclone unit 130. That is, the air inlet 143 of the second cyclone unit 130 may be disposed inside the filter part 161.

Thus, since the air passing through the mesh 164 directly flows to the air inlet 143 of the second cyclone unit 130, a passage of the air may be shortened to reduce a flow loss.

For example, the air separated from the dust in the first cyclone unit 110 may be filtered while passing through the mesh 164 of the filter part 161 and then introduced into the filter part 161 through the openings 162 of the filter part 161. The air introduced into the filter part 161 is guided to the cyclone module 131 by the guide module 140 to perform the dust separation process again.

The dust separated from the air in the cyclone module 131 is discharged through the dust discharge part 135 to flow downward and then stored in the second dust storage part 123. On the other hand, the air separated from the dust in the cyclone module 131 is discharged to the discharge guide 28 through the air outlet 145.

The air discharged to the discharge guide 28 flows along the discharge guide 28 to pass through the lower motor housing 27 and then ascends along the first air passage 232 within the flow guide 22. Also, the air of the first air passage 232 passes through the pre-filter 29.

The air passing through the pre-filter 29 passes through the suction motor 20 within the upper motor housing 26. The air flows into the suction motor 20 by the impeller 200 and then is discharged to the lower motor housing 27. Also, the air discharged to the lower motor housing 27 flows to the second air passage 234.

Also, the air flowing to the second air passage 234 passes through the filter unit 50 and then is discharged to the outside through the air exit 522.

Figure 16:
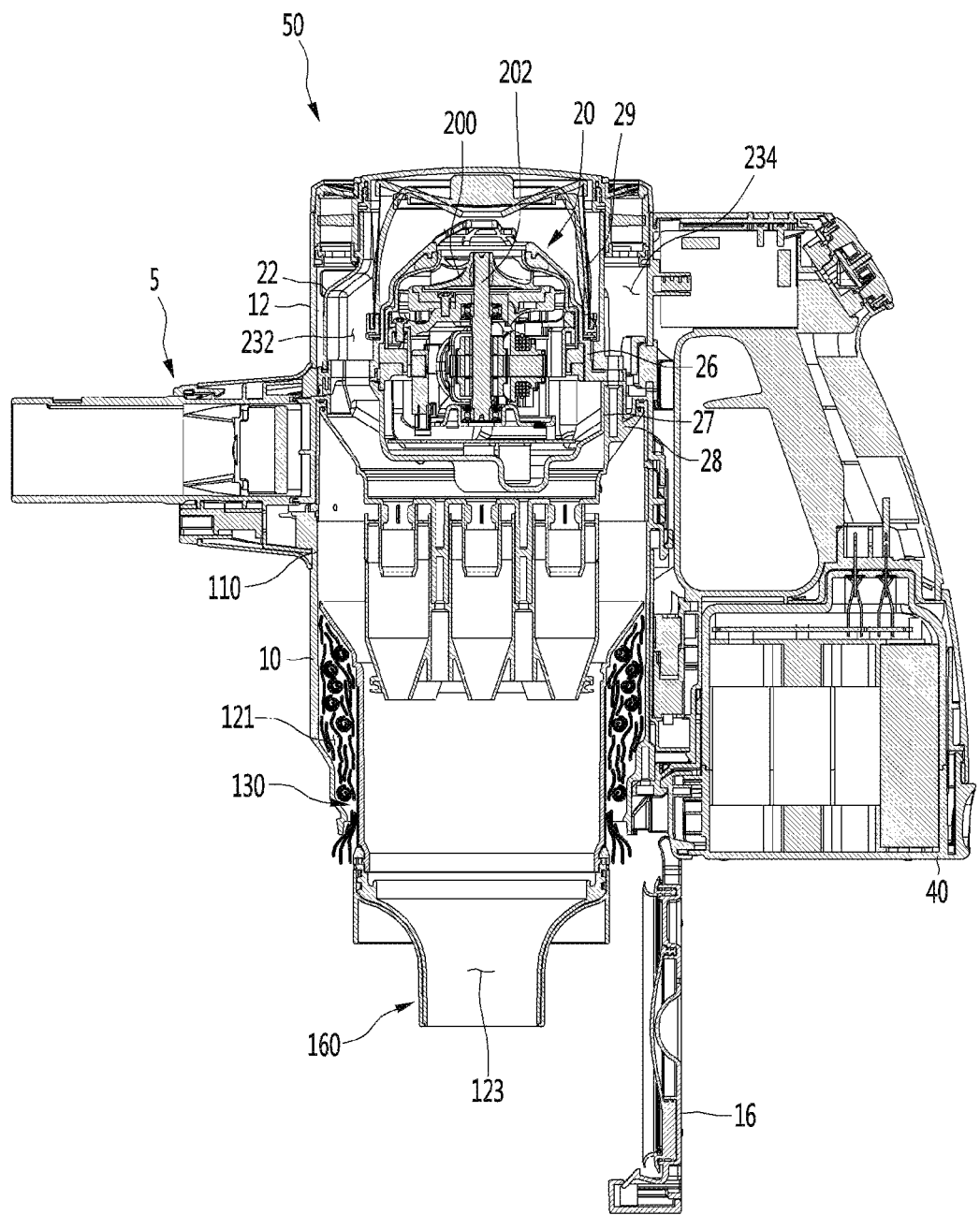
FIG. 16 is a longitudinal cross-sectional view illustrating a process of separating the guide unit from the main body of the cleaner according to an embodiment.

FIG. 16 is a longitudinal cross-sectional view illustrating a process of separating the guide unit from the main body of the cleaner according to an embodiment.

Referring to FIG. 16, when raising a pet, the pet's hair may be present on the bottom. The foreign substances such as the pet's hair or the human hairs may be removed from the bottom through the cleaner 1.

Thus, the foreign substances such as the pet's hair or the human hairs may be wound around the guide unit 160 within the dust container 120 or attached to the inner circumferential surface of the dust container 120 and thus be present in a bound state in the dust container.

In this state, when the body cover 16 of the dust container 120 rotates, the dust within the dust container 120 may be discharged from the dust container 120. However, although the body cover 16 rotates, the foreign substances such as the pet's hair or the human hairs may remain in the dust container 120.

The remaining foreign substances may be removed while the guide unit 160 is separated from the main body 2.

Particularly, as illustrated in FIG. 16, the cleaning part 169 may come into contact with the inner circumferential surface of the dust container 120 or be disposed adjacent to the inner circumferential surface of the dust container 120 at the uppermost portion of the guide unit 160.

Thus, while the guide unit 160 is separated downward from the main body 2, the foreign substances within the dust container 120 may be hung by the cleaning part 169. The foreign substances hung by the cleaning part 169 are withdrawn to the outside from the main body 2 together with the guide unit 160.

According to this embodiment, since the foreign substances are discharged from the dust container 120 while the guide unit 160 is separated without directly taking out the foreign substances such as the hairs within the dust container 120 or directly cleaning the inner circumferential surface of the dust container 120, the user's convenience may be improved.

What is claimed is:

1. A vacuum cleaner comprising:
a suction unit configured to guide air and dust;
a main body comprising a first cyclone unit configured to separate the air and the dust, which are suctioned through the suction unit, from each other and a second cyclone unit configured to separate the dust from the air discharged from the first cyclone unit; and
a guide unit disposed in the main body to partition a first dust storage part, in which the dust separated in the first cyclone unit is stored, and a second dust storage part, in which the dust separated in the second cyclone unit is stored, from each other,
wherein the guide unit comprises:
a filter part surrounding the second cyclone unit and configured to filter the air that is separated from the dust in the first cyclone unit while flowing to the second cyclone unit, and
a storage unit connected to a lower portion of the filter part and defining the second dust storage part, and
wherein the guide unit is separably coupled to the main body, and based on the guide unit being separated from the main body, a dust discharge part of the second cyclone unit is exposed to an outside, and
wherein the filter part and the storage unit are separated from the second cyclone unit together.

2. The vacuum cleaner of claim 1, wherein the filter part comprises:
a filter body having a plurality of openings; and
a mesh covering the plurality of openings,
wherein an air inlet of the second cyclone unit is disposed inside the filter part.

3. The vacuum cleaner of claim 1, wherein an air inlet of the second cyclone unit is disposed lower than an axis in a longitudinal direction of the suction unit.

4. The vacuum cleaner of claim 1, wherein the main body comprises a dust container comprising the first dust storage part,
the dust container includes a discharge opening, and
the guide unit is separated downward from the dust container through the discharge opening.

5. The vacuum cleaner of claim 4, wherein the guide unit further comprises a cleaning part extending to an inner circumferential surface of the dust container.

6. The vacuum cleaner of claim 1, wherein:
a sealing member is disposed on the second cyclone unit, and
the storage unit comprises a contact rib coming into contact with the sealing member.

7. The vacuum cleaner of claim 6, wherein:
the second cyclone unit comprises a sealing member coupling part to which the sealing member is coupled,
the sealing member coupling part is disposed on the second cyclone unit to allow the dust discharge part of the second cyclone unit to pass therethrough,
a sealing member fitting groove into which the sealing member is fitted is defined in a lower portion of the sealing member coupling part, and
the contact rib comes into contact with a bottom surface of the sealing member.

8. The vacuum cleaner of claim 7, wherein each of the sealing member and the contact rib has a ring shape, and the dust discharge part of the second cyclone unit is disposed in a region defined by the contact rib in the state in which the contact rib comes into contact with the bottom surface of the sealing member.

9. The vacuum cleaner of claim 6, wherein the storage unit comprises an inner body coupled to the filter part and an outer body surrounding the inner body.

10. The vacuum cleaner of claim 9, wherein the dust discharge part of the second cyclone unit and the sealing member are disposed inside the inner body, and the contact rib protrudes from the inner body.

11. The vacuum cleaner of claim 9, further comprising at least one sealer disposed between the inner body and the outer body.

12. The vacuum cleaner of claim 1, wherein the filter part further comprises a cleaning part extending outward from an upper end of the filter part.

13. The vacuum cleaner of claim 12, wherein:

the cleaning part inclinedly extends horizontally or upward from the filter part, and the cleaning part has an end coming into contact with an inner circumferential surface of the first dust storage part or disposed adjacent to the inner circumferential surface of the first dust storage part.

14. The vacuum cleaner of claim 1, wherein:

the main body further comprises a discharge guide configured to guide the air discharged from the second cyclone unit, and the filter part is separably coupled to the discharge guide.

15. The vacuum cleaner of claim 14, wherein the discharge guide comprises a first coupling part to be coupled to the filter part, the filter part comprises a second coupling part to be coupled to the first coupling part, and the second coupling part comprises a first groove into which the first coupling part is accommodated and a second groove extending from the first groove in a direction crossing that in which the first coupling part is accommodated into the first groove so that coupling of the first coupling part and the second coupling part is completed by an rotational operation of the filter part.

16. A vacuum cleaner comprising:

a suction unit configured to guide air and dust;

a main body comprising a first cyclone unit configured to separate the air and the dust, which are suctioned through the suction unit, from each other and a second cyclone unit configured to separate the dust from the air discharged from the first cyclone unit;

a sealing member installed on the second cyclone unit; and a guide unit separably coupled to the main body, wherein the guide unit covers at least a portion of the second cyclone unit in the state in which the guide unit is coupled to the main body, wherein the guide unit comprises:

a filter part surrounding the second cyclone unit and configured to filter the air that is separated from the dust in the first cyclone unit while flowing to the second cyclone unit, a storage unit connected to a lower portion of the filter part and including an inner body coupled to the filter part and an outer body that separably surrounds the inner body, and a contact rib coming into contact with the sealing member in the state in which the guide unit is coupled to the main body, wherein a dust discharge part of the second cyclone unit and the sealing member are disposed inside the inner body, and the contact rib protrudes from the inner body.

17. The vacuum cleaner of claim 16, wherein, based on the guide unit being separated from the main body, the dust discharge part of the second cyclone unit is exposed to an outside.

18. The vacuum cleaner of claim 16, wherein the guide unit comprises an opening through which the air primarily separated from the dust in the first cyclone unit passes.

* * * * *